(12) United States Patent
Ito et al.

(10) Patent No.: US 11,584,366 B2
(45) Date of Patent: Feb. 21, 2023

(54) BRAKING CONTROL DEVICE

(71) Applicants: DENSO CORPORATION, Kariya (JP); TOYOTA JIDOSHA KABUSHIKI KAISHA, Toyota (JP)

(72) Inventors: Yosuke Ito, Kariya (JP); Takaharu Oguri, Kariya (JP); Kei Kamiya, Kariya (JP); Takahiro Baba, Kariya (JP); Ryo Takaki, Kariya (JP); Tomoyuki Doi, Gotemba (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 16/869,529

(22) Filed: May 7, 2020

(65) Prior Publication Data
US 2020/0262421 A1    Aug. 20, 2020

Related U.S. Application Data

(63) Continuation of application No. PCT/JP2018/040803, filed on Nov. 2, 2018.

(30) Foreign Application Priority Data

Nov. 8, 2017 (JP) .............................. JP2017-215149

(51) Int. Cl.
*B60W 10/18* (2012.01)
*B60W 30/09* (2012.01)
(Continued)

(52) U.S. Cl.
CPC ............ *B60W 30/09* (2013.01); *B60W 10/18* (2013.01); *B60W 10/30* (2013.01);
(Continued)

(58) Field of Classification Search
CPC ...... B60W 30/09; B60W 10/18; B60W 10/30; B60W 30/0956; B60W 30/18159;
(Continued)

(56) References Cited

U.S. PATENT DOCUMENTS 8,571,743 B1 * 10/2013 Cullinane ................ G05D 1/00
 701/23
9,475,496 B2 * 10/2016 Attard ................. B60W 30/182
(Continued)

FOREIGN PATENT DOCUMENTS

JP    2004232557 A   *  8/2004   ......... F02N 11/0837
JP    2008-293440 A    12/2008
(Continued)

*Primary Examiner* — Hunter B Lonsberry
*Assistant Examiner* — Daniel M. Robert
(74) *Attorney, Agent, or Firm* — Maschoff Brennan

(57) ABSTRACT

A braking control device for controlling braking of a host vehicle. For a state in which a host vehicle is stopped in an intersection by automatic emergency braking and an oncoming vehicle is approaching in an oncoming lane, the host vehicle prohibits secondary braking, flashes a hazard lamp, and prohibits an idling stop. For a state in which it is determined in that the vehicle is stopped and it is determined in that it is safe for the vehicle to start moving, the host vehicle releases stop maintenance braking.

6 Claims, 7 Drawing Sheets

(51) Int. Cl.
*B60W 30/18* (2012.01)
*B60W 10/30* (2006.01)
*B60W 30/095* (2012.01)

(52) U.S. Cl.
CPC .. *B60W 30/0956* (2013.01); *B60W 30/18159* (2020.02); *B60W 2555/60* (2020.02)

(58) Field of Classification Search
CPC ...... B60W 2555/60; B60T 7/12; F02D 29/02; G08G 1/16
See application file for complete search history.

(56) References Cited

U.S. PATENT DOCUMENTS

| | | | | |
|---|---|---|---|---|
| 11,208,084 | B2* | 12/2021 | Kamiya | G08G 1/16 |
| 2010/0010723 | A1 | 1/2010 | Taki et al. | |
| 2011/0153166 | A1* | 6/2011 | Yester | B60W 30/18154 701/45 |
| 2015/0105999 | A1* | 4/2015 | Sangameswaran | F02D 17/00 701/112 |
| 2015/0248131 | A1* | 9/2015 | Fairfield | G05D 1/0033 701/2 |
| 2015/0338849 | A1* | 11/2015 | Nemec | B60K 35/00 701/25 |
| 2019/0291729 | A1* | 9/2019 | Kamiya | B60W 30/09 |
| 2020/0026284 | A1* | 1/2020 | Hiramatsu | G01C 21/36 |

FOREIGN PATENT DOCUMENTS

| | | | |
|---|---|---|---|
| JP | 2010-033441 A | | 2/2010 |
| JP | 2012-056347 A | | 3/2012 |
| JP | 2012056347 A | * | 3/2012 |
| JP | 2012-218551 A | | 11/2012 |
| JP | 2013-133072 A | | 7/2013 |
| JP | 2015-063220 A | | 4/2015 |
| JP | 2016-207016 A | | 12/2016 |
| WO | WO-2015151250 A1 | * | 10/2015 ............ G07C 5/008 |

* cited by examiner

BRAKING CONTROL DEVICE

CROSS-REFERENCE TO RELATED APPLICATION

The present application is a continuation application of International Application No. PCT/JP2018/040803, filed Nov. 2, 2018, which claims priority to Japanese Patent Application No. 2017-215149, filed Nov. 8, 2017. The contents of these applications are incorporated herein by reference in their entirety.

BACKGROUND

1. Technical Field

The present disclosure relates to braking control.

2. Related Art

There is a technique for avoiding the risk of a rear-end collision in which, when an idling stop is executed and the parking brake is activated while a vehicle is stopped in an intersection, the parking brake is released and the vehicle is moved when it is determined that there is a risk of rear-end collision.

SUMMARY

An aspect of the technique according to the present disclosure is a braking control device, including: an operating unit that operates automatic emergency braking in response to detecting that an obstacle presents in a traveling direction of a vehicle; a determining unit that, in a case where the vehicle is stopped in an intersection by the automatic emergency braking, determines whether it is safer for the vehicle to continue being stopped, or safer for the vehicle to start moving; and a safety ensuring unit that, in a case where the determining unit determines that it is safer for the vehicle to start moving, releases the stopped state which was caused by the automatic emergency braking.

DETAILED DESCRIPTION OF THE PREFERRED EMBODIMENTS

JP2008-121583A (Japanese Unexamined Patent Application Publication No. 2008-121583) discloses a technique for avoiding the risk of a rear-end collision in which, when an idling stop is executed and the parking brake is activated while a vehicle is stopped in an intersection, the parking brake is released and the vehicle is moved when it is determined that there is a risk of rear-end collision.

In the case of the background art described above, safety when the vehicle has stopped due to automatic emergency braking is not considered. In view of the above, it is an object of the present disclosure to improve safety while a vehicle is stopped in an intersection by automatic emergency braking.

An aspect of the technique according to the present disclosure is a braking control device, including: an operating unit that operates automatic emergency braking in response to detecting that an obstacle presents in a traveling direction of a vehicle; a determining unit that, in a case where the vehicle is stopped in an intersection by the automatic emergency braking, determines whether it is safer for the vehicle to continue being stopped, or safer for the vehicle to start moving; and a safety ensuring unit that, in a case where the determining unit determines that it is safer for the vehicle to start moving, releases the stopped state which was caused by the automatic emergency braking. According to this embodiment, safety while a vehicle is stopped in an intersection by automatic emergency braking is improved.

The above and other objectives, features and advantages of the present disclosure will be made more clear by the following detailed description, given referring to the appended drawings.

Embodiments of the present disclosure are described below with reference to the drawings.

Figure 1:
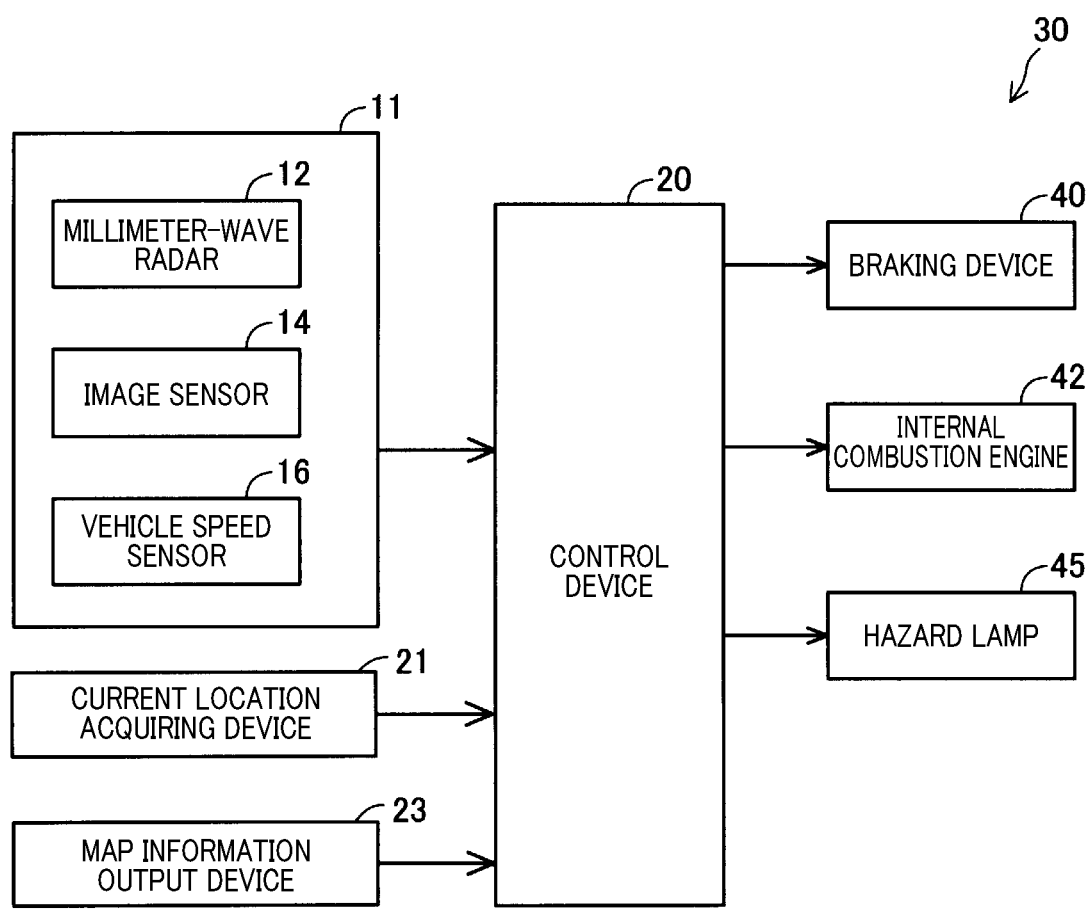
FIG. 1 is a block diagram of a vehicle.

As illustrated in FIG. 1, a vehicle 30 includes a sensor group 11, a control device 20, a braking device 40, an internal combustion engine 42, and a hazard lamp 45. The vehicle 30 is a self-driving car of level 1 or higher. More specifically, the vehicle 30 has at least a function of automatically performing braking.

The sensor group 11 includes a millimeter-wave radar 12, an image sensor 14, a vehicle speed sensor 16, and a yaw rate sensor 18. The millimeter-wave radar 12 emits a frequency-modulated radar wave in the millimeter wave band and measures the reflected wave. The millimeter-wave radar 12 emits a millimeter wave toward a range that can include a target existing in front of the vehicle 30. The target is, for example, another vehicle, a pedestrian, a bicycle, or the like. The front of the vehicle 30 includes right front and left front in addition to the front.

The image sensor 14 captures an image of the front of the vehicle 30. The imaging range of the image sensor 14 is a range that can include a target existing in front of the vehicle 30. The vehicle speed sensor 16 inputs the vehicle speed of the vehicle 30 to the control device 20.

A current location acquiring device 21 acquires the latitude and longitude indicating the current location of the vehicle 30 (hereinafter, simply referred to as the current location) and inputs the acquired latitude and longitude to a map information output device 23. The current location acquiring device 21 acquires the current location using a signal from a GPS satellite or the like.

The map information output device 23 inputs the map information at the inputted current location to the control device 20. When the current location is near an intersection, the map information to be inputted includes information about the intersection. The information about the intersection includes information on how the roads intersect, the presence or absence of a traffic signal, and the like.

The intersection in the present embodiment means an area where two or more roads intersect, and means an area where a vehicle may travel across an oncoming lane. Therefore, the intersection in the present embodiment is not limited to a crossroad, but also includes a T-junction and the like.

The internal combustion engine 42 is for example a gasoline engine. The control device 20 controls the rotation speed of the internal combustion engine 42. In a case where the vehicle speed is zero and a specified condition such as the remaining capacity of the battery or the like is satisfied, the control device 20 executes an idling stop.

The braking device 40 includes a service brake and a parking brake. The service brake is operated when a driver steps on a brake pedal. The parking brake is activated by a driver manually pulling up a brake lever. The service brake and the parking brake may be automatically operated by the control device 20 in some cases.

The control device 20 includes a plurality of ECUs. The control device 20 controls the components of the vehicle 30 described above.

Figure 2:
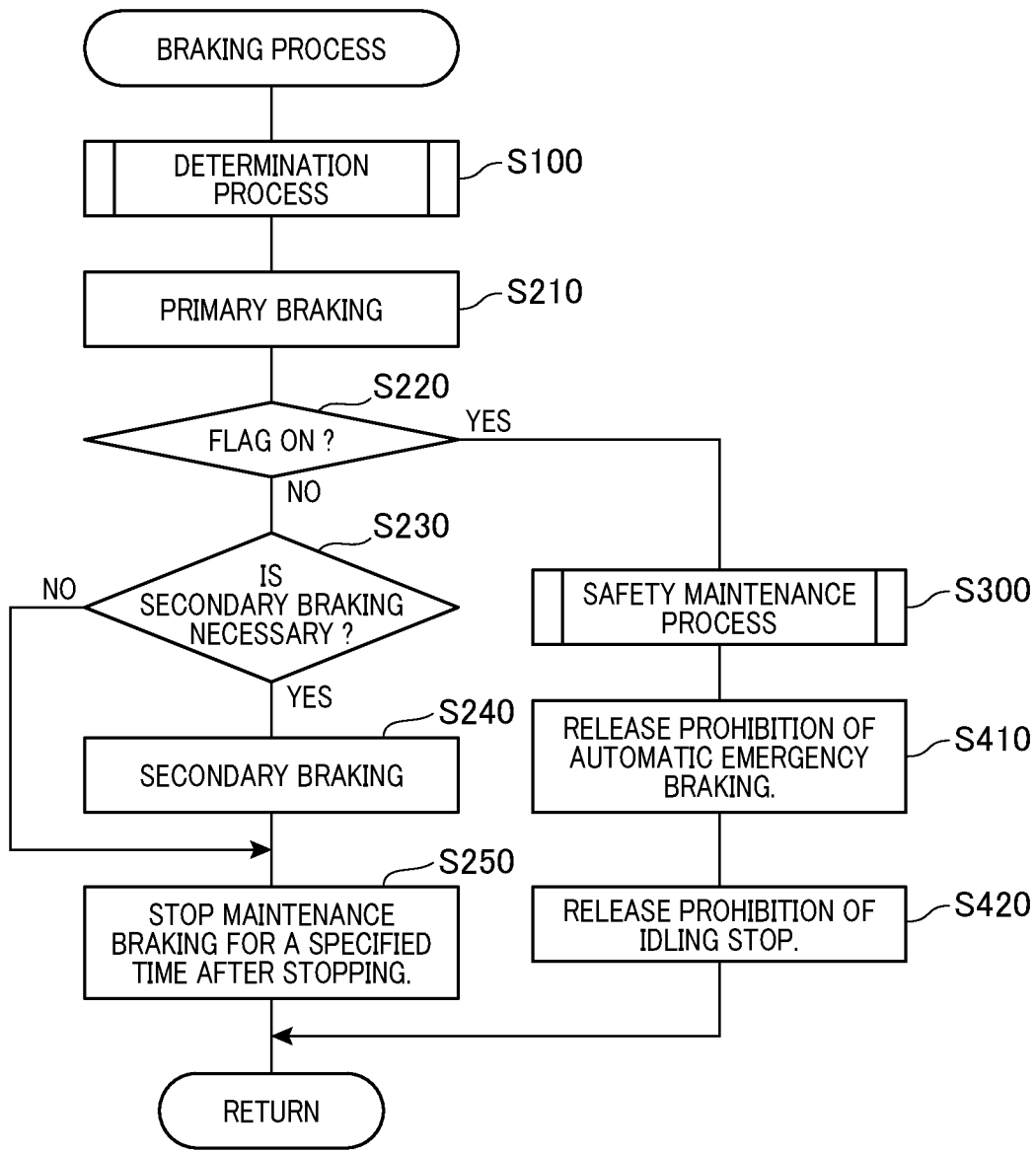
FIG. 2 is a flowchart illustrating a braking process.

The control device 20 repeatedly executes a braking process illustrated in FIG. 2 while the automatic braking function is set to ON.

Figure 3:
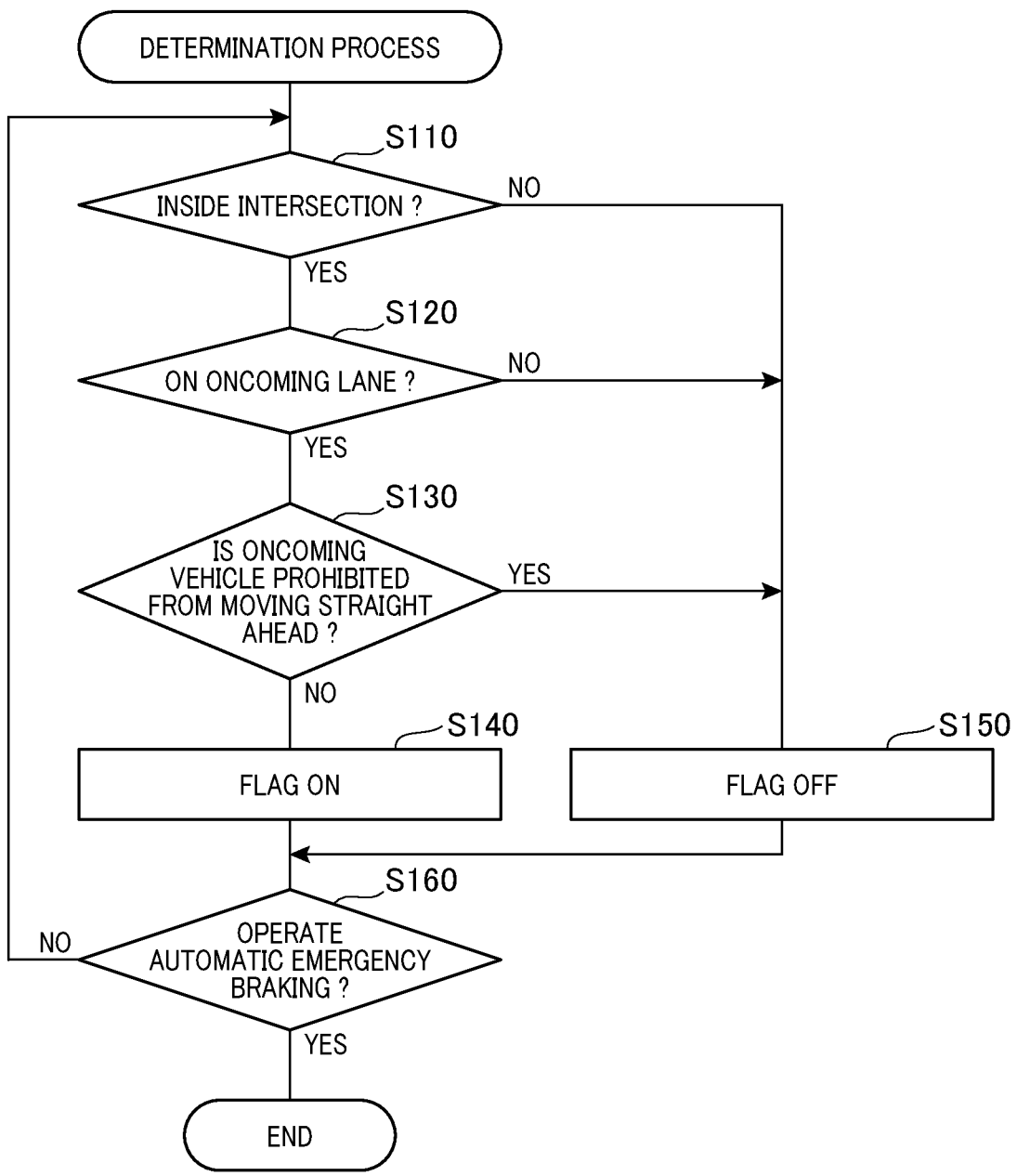
FIG. 3 is a flowchart illustrating a determination process.

The control device 20 first performs a determination process as S100. After the determination process is started, as illustrated in FIG. 3, the control device 20 determines whether at least a part of the vehicle 30 is located within the intersection as S110. In the example illustrated in FIG. 4, the area J corresponds to the intersection. In S110 and in S120 next, information outputted from the current location acquiring device 21 and the map information output device 23 is used.

Figure 4:
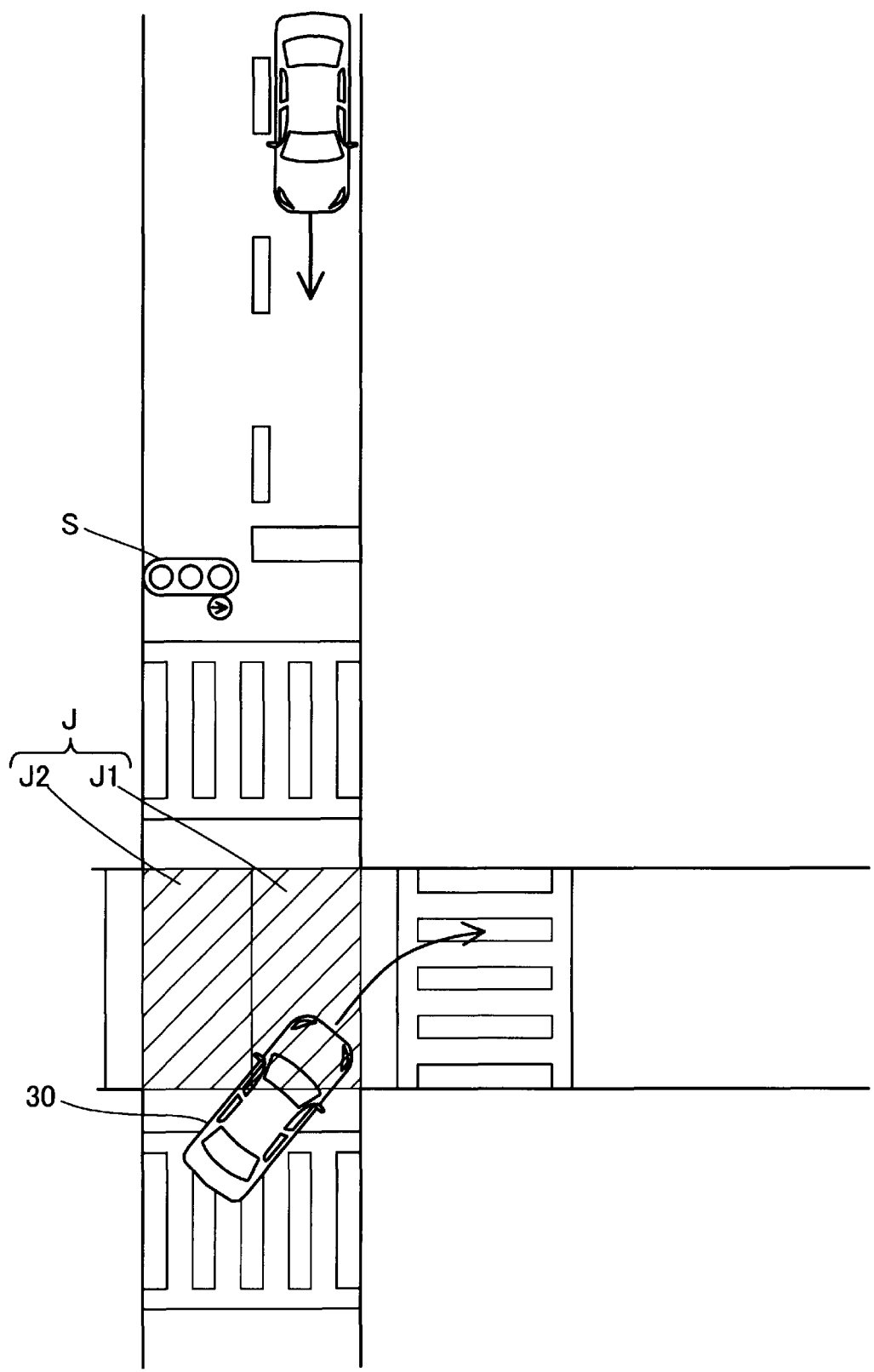
FIG. 4 is a diagram illustrating a state in which a vehicle is stopped inside an intersection.

In a case where YES is determined in S110, the control device 20 proceeds to S120 and determines whether the current location is on an oncoming lane. Here, the oncoming lane means an area where an oncoming vehicle traveling straight ahead travels. Since S120 is based on the determination of YES in S110, in the example illustrated in FIG. 4, in a case where at least a part of the vehicle 30 is located in the area J1, YES is determined in S120. FIG. 4 illustrates a case where a part of the vehicle 30 is located in the area J1.

In a case where YES is determined in S120, the control device 20 proceeds to S130 and determines whether an oncoming vehicle is prohibited from traveling straight ahead. More specifically, it is determined whether the right arrow of an arrow traffic signal to be followed by the host vehicle is lit up green. In Japan, when the right arrow of an arrow traffic signal to be followed by the host vehicle is lit up green, the signal to be followed by the oncoming vehicle is operated so as to prohibit travel straight ahead. FIG. 4 illustrates a state in which the right arrow is lit up green on the arrow traffic signal S to be followed by the host vehicle.

In a case where NO is determined in S130, the control device 20 proceeds to S140 and sets the flag to ON. The flag being ON indicates that, when a vehicle is stopped inside an intersection when automatic emergency braking is activated, it is safer for the vehicle to start moving than to continue being stopped. Automatic emergency braking is also referred to as collision avoidance braking.

The term "safe" as used here means the level of probability of collision with an oncoming vehicle that is traveling straight ahead. Stopping in the present embodiment means a state where the vehicle speed is zero. In a situation where YES is determined in S110 and S120 and NO is determined in S130, there is a high probability that a collision will occur if the vehicle 30 continues to be stopped and the oncoming vehicle traveling straight ahead does not avoid the collision.

When NO is determined in any of S110 and S120, or when YES is determined in S130, the control device 20 proceeds to S150 and sets the flag to OFF. In other words, in these cases, when the vehicle is stopped in a case where automatic emergency braking is operated, it is safer to continue being stopped than for the vehicle to start moving.

When the flag is set, the control device 20 proceeds to S160, which determines whether the situation is such that automatic emergency braking should be operated. The control device 20 executes S160 based on input from the millimeter-wave radar 12 and the image sensor 14. In a case where NO is determined in S160, the control device 20 returns to S110. In a case where YES is determined in S160, the control device 20 terminates the determination process and proceeds to S210.

After proceeding to S210, the control device 20 executes primary braking. Primary braking is braking with a braking force G1 illustrated in FIG. 5 and FIG. 6 as an upper limit. Here, the braking force is a parameter having a correlation with the deceleration (m/s$^2$) when the vehicle 30 is traveling. However, in the present embodiment, the braking force may be controlled even in a case where the vehicle speed of the vehicle 30 is zero. In this case, the braking force is a parameter not related to the deceleration.

The control device 20 proceeds to S220 while executing primary braking, and determines whether the flag is set to ON. In a case where the flag is set to OFF, the control device 20 proceeds to S230 and determines whether secondary braking is necessary. Secondary braking is braking with the braking force G2 illustrated in FIG. 5 as the upper limit of the braking force. The braking force G2 is larger than the braking force G1.

In a case where the risk of a collision with an obstacle ahead is avoided by primary braking before the vehicle speed becomes zero, the control device 20 determines that secondary braking is unnecessary. In this case, the control device 20 proceeds to S250 at the timing when the vehicle speed becomes zero.

Figure 5:
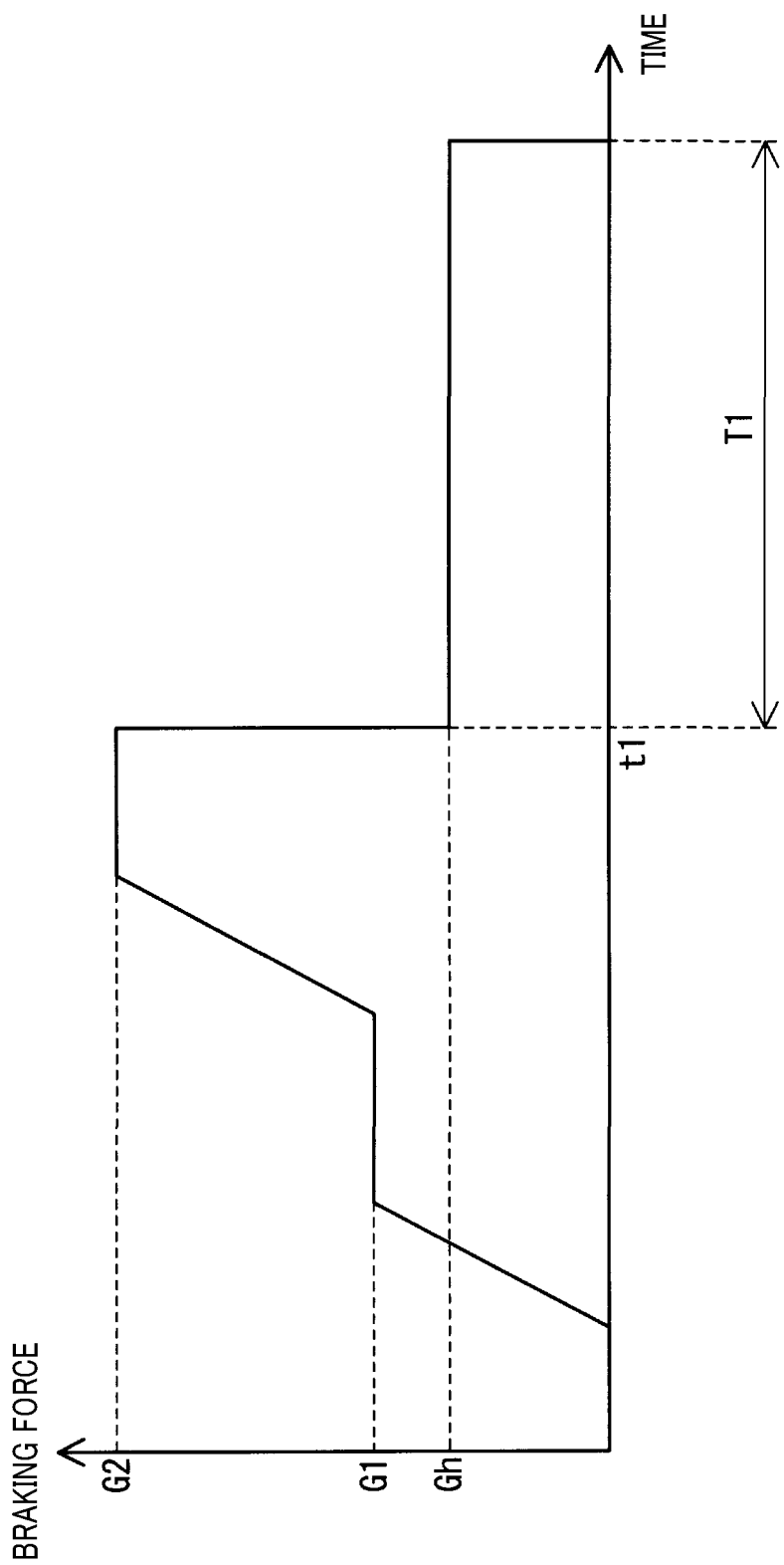
FIG. 5 is a graph illustrating a braking force by primary braking, secondary braking, and stop maintenance braking.

On the other hand, when it is determined that secondary braking is necessary, the control device 20 executes secondary braking. The control device 20 proceeds to S250 at the timing when the vehicle speed becomes zero. In FIG. 5, the timing at which the vehicle speed becomes zero is indicated as being time t1.

After proceeding to S250, the control device 20 changes the braking force to the braking force Gh, and maintains the braking force Gh for a specified time T1. The operation of maintaining the braking force at the braking force Gh is also called a stop maintenance braking. In the present embodiment A, the parking brake is used for stop maintenance braking. While stop maintenance braking is continued, the vehicle 30 does not start to move even when stepping on the accelerator pedal. After S250 terminates, the control device 20 repeats the braking process from S100.

On the other hand, in a case where the flag is ON, the control device 20 proceeds to S300 and executes a safety ensuring process.

Figure 7:
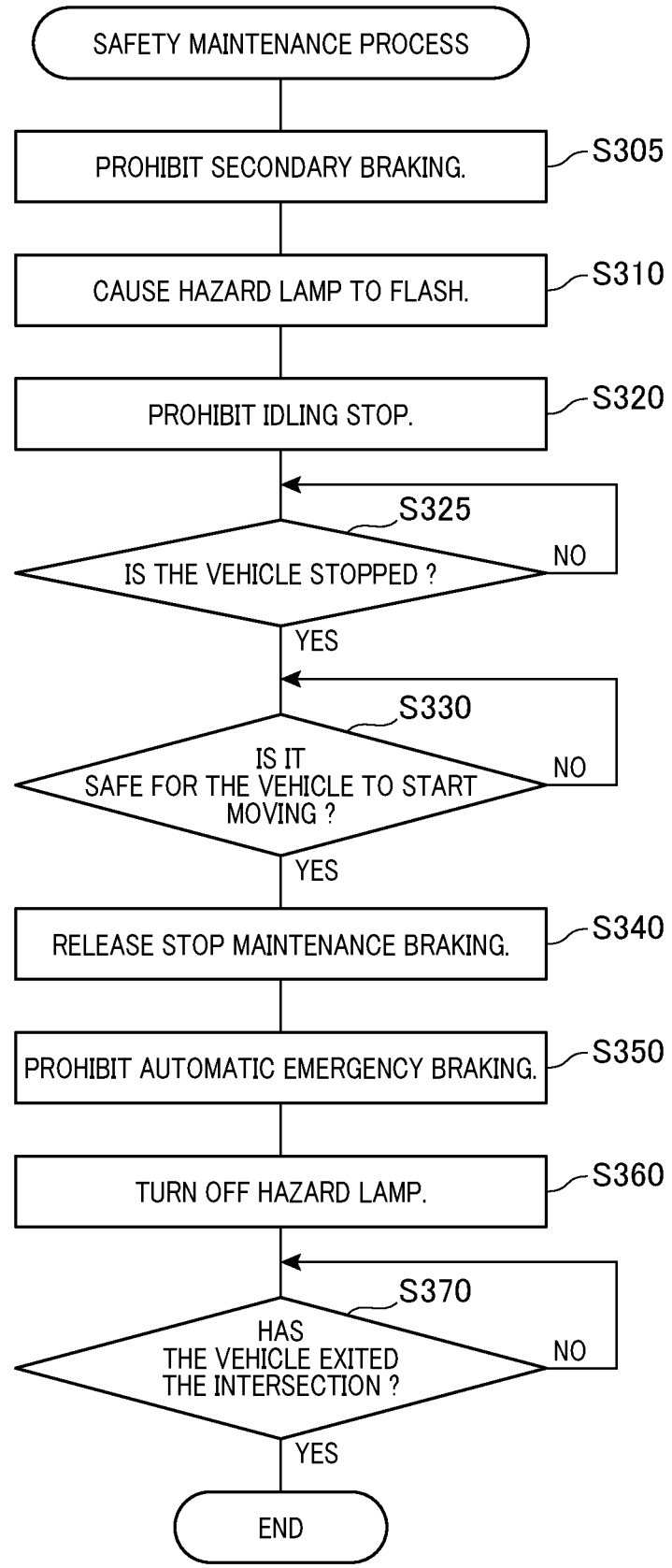
FIG. 7 is a flowchart illustrating a safety ensuring process.

As illustrated in FIG. 7, after the safety ensuring process is started, the control device 20 prohibits secondary braking as S305. Continuing, the control device 20 causes the hazard lamp 45 to flash as S310. This reduces the risk of a rear-end collision by a following vehicle.

Next, the control device 20 proceeds to S320 and prohibits an idling stop. Subsequently, the control device 20 proceeds to S325 and determines whether the vehicle has stopped. In the present embodiment, in a case where automatic emergency braking is operated while the flag is ON, braking by primary braking is executed until the vehicle stops. S325 is repeatedly executed until the vehicle stops.

After it is determined that the vehicle has stopped, the control device 20 proceeds to S330 and determines whether it is safe for the vehicle to start moving. The term "safe" as used herein means that there is no longer a risk of colliding with an obstacle that has caused automatic emergency braking to operate even when the vehicle starts to move. In a case where there is a risk of colliding with an obstacle when the vehicle starts to move, S330 is repeatedly executed. While S330 is being repeated, stop maintenance braking is continued.

When it is determined that it is safe for the vehicle to start moving, the control device 20 proceeds to S340 and releases stop maintenance braking. Idling stop is prohibited, so the vehicle 30 will start moving when the accelerator pedal is depressed.

Figure 6:
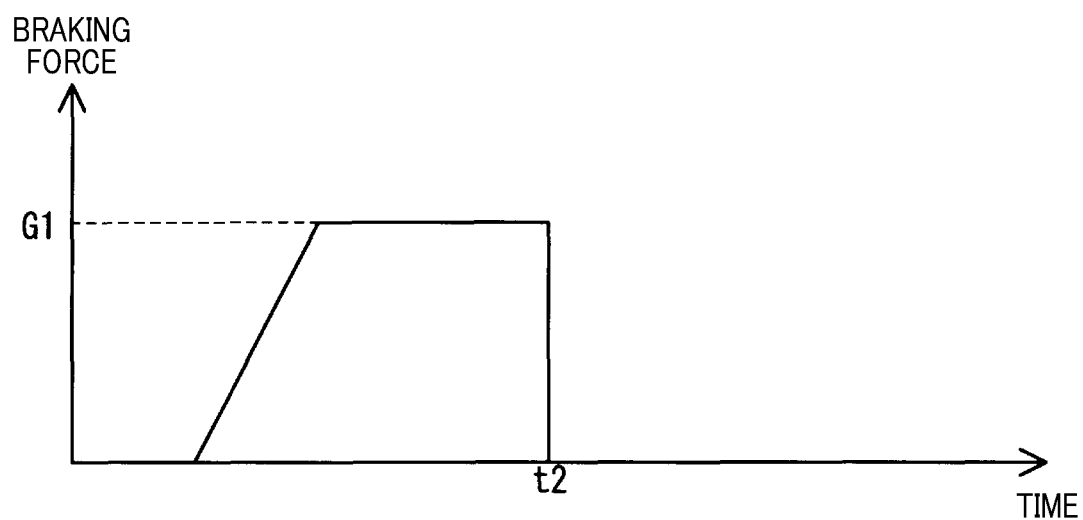
FIG. 6 is a graph illustrating a braking force by primary braking.

FIG. 6 illustrates an example in which, at the time the vehicle is stopped at time t2, it is determined that it is safe even when the vehicle starts moving. Therefore, stop maintenance braking is not performed. In this case, S340 is substantially not performed.

The control device 20 then proceeds to S350 and prohibits automatic emergency braking. The control device 20 then proceeds to S360 and turns OFF the hazard lamp 45. The control device 20 then proceeds to S370, which determines whether the vehicle has exited the intersection. The control device 20 repeats S370 until it is determined that the vehicle has exited the intersection.

When it is determined that the vehicle has exited the intersection, the control device 20 terminates the safety ensuring process. After that, the control device 20 proceeds to S410 and releases the prohibition of automatic emergency braking. Continuing, the control device 20 proceeds to S420 and releases the prohibition of the idling stop. After S420, the control device 20 repeats the braking process from S100.

According to the embodiment described above, the safety when the vehicle stops within an intersection due to automatic emergency braking is improved. In a situation where the vehicle is stopped in an intersection and on the oncoming lane, and a signal allows an oncoming vehicle to pass through the intersection by going straight ahead, there is a risk that the vehicle will collide with the oncoming vehicle if the vehicle continues to be stopped. In such a situation, it is more likely that quickly passing through the intersection will be safer. In the present embodiment, in order to realize such an operation, stop maintenance braking is terminated in the shortest possible time in the above situation.

In the situation described above, by prohibiting secondary braking, the risk of being hit by a following vehicle is reduced, and this prevents the stopped position of the vehicle from deviating from the original route due to the occurrence of skidding which was caused by secondary braking, making it possible to turn right smoothly.

The correspondence between the embodiments and the claims will be described. The control device 20 corresponds to a braking control device, S100 and S220 correspond to a determining unit, S210 and S240 correspond to an operating unit, and S300 corresponds to a safety ensuring unit.

The present disclosure is not limited to the embodiments, examples, and modifications of the present description, and may be implemented by various configurations without departing from the gist of the present disclosure. For example, the technical features in the embodiments, examples, and modifications corresponding to the technical features in each embodiment described in the summary of the invention section are for solving some or all of the problems described above, or in order to achieve some or all of the effects described above, replacement and combination may be made as appropriate. Technical features that are not described as essential in this description may be deleted as appropriate. For example, the following example is given.

The embodiments describe left-hand traffic as an example; however, the embodiments may also be applied to right-hand traffic. In the case of right-hand traffic, replacement may be performed as appropriate. For example, a right turn is replaced with a left turn, and a right arrow is replaced with a left arrow.

In the embodiments described above, some or all of the functions and processes realized by software may be realized by hardware. Moreover, some or all of the functions and processes realized by hardware may be realized by software. As the hardware, for example, various circuits such as integrated circuits, discrete circuits, or a circuit module or the like combining those circuits may be used.

What is claimed is:

1. A braking control device, comprising:
   a memory; and
   a processor, wherein a set of computer-executable instructions are stored on the memory so that the processor is configured to:
   operate automatic emergency braking in response to detecting that an obstacle presents in a traveling direction of a host vehicle;
   determine whether at least part of the host vehicle is located within an intersection as a result of the automatic emergency braking;
   in response to determining that at least part of the host vehicle is located within the intersection, determine whether a location of the host vehicle is in an oncoming lane which is an area where an oncoming vehicle traveling straight ahead travels;
   in response to determining that the location of the host vehicle is in the oncoming lane, determine whether the oncoming vehicle is prohibited from traveling straight ahead;
   in response to determining that the oncoming vehicle is not prohibited from traveling straight ahead, determine that it is safer for the host vehicle to start moving rather than to continue being stopped; and
   in response to determining that it is safer for the host vehicle to start moving, release a stopped state which was caused by the automatic emergency braking.

2. The braking control device according to claim 1, wherein in a case where the host vehicle is stopped in the intersection by the automatic emergency braking, the processor is configured to cause a hazard lamp to flash.

3. The braking control device according to claim 1, wherein in a case where the automatic emergency braking is operated in the intersection, the processor is configured to cause secondary braking.

4. The braking control device according to claim 1, wherein in a case where the host vehicle is stopped in the intersection by the automatic emergency braking, the processor is configured to prohibit idling stop until the host vehicle exits the intersection.

5. The braking control device according to claim 1, wherein in a case where the host vehicle is stopped in the intersection by the automatic emergency braking, the processor is configured to prohibit the automatic emergency braking until the host vehicle exits the intersection.

6. A braking control device, comprising:
   a memory; and
   a processor, wherein a set of computer-executable instructions are stored on the memory so that the processor is configured to:

operate automatic emergency braking in response to detecting that an obstacle presents in a traveling direction of a host vehicle;

in a case where the host vehicle is stopped in an intersection by the automatic emergency braking, determine whether it is safer for the host vehicle to continue being stopped, or safer for the host vehicle to start moving; and release a stopped state which was caused by the automatic emergency braking in response to determining that it is safer for the host vehicle to start moving, wherein in a case where the host vehicle is stopped in the intersection by the automatic emergency braking, the processor is further configured to prohibit the automatic emergency braking until the host vehicle exits the intersection.

\* \* \* \* \*